US008542085B2

(12) United States Patent
Stancu et al.

(10) Patent No.: US 8,542,085 B2
(45) Date of Patent: Sep. 24, 2013

(54) HIGH FREQUENCY ROTARY TRANSFORMER FOR SYNCHRONOUS ELECTRICAL MACHINES

(75) Inventors: Constantin C. Stancu, Torrance, CA (US); Peter J. Savagian, Bloomfield Hills, CA (US); Khwaja M. Rahman, Troy, MI (US); Robert T. Dawsey, Torrance, CA (US); Erik Hatch, Cypress, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/036,652

(22) Filed: Feb. 28, 2011

(65) Prior Publication Data

US 2012/0218069 A1 Aug. 30, 2012

(51) Int. Cl.

| | |
|---|---|
| ***H01F 21/04*** | (2006.01) |
| ***H01F 21/06*** | (2006.01) |
| ***H02K 19/00*** | (2006.01) |
| ***H02P 1/46*** | (2006.01) |

(52) U.S. Cl.
USPC ........... 336/115; 336/119; 336/120; 310/160; 310/162; 318/700

(58) Field of Classification Search
CPC ........................................................ H01F 38/18
USPC ........ 336/115, 119, 120, 122, 123; 310/160, 310/162, 166, 177, 179; 318/700, 705, 711
See application file for complete search history.

(56) References Cited

U.S. PATENT DOCUMENTS

| | | | | |
|---|---|---|---|---|
| 2,284,159 | A * | 5/1942 | Lindenblad | 310/308 |
| 2,415,007 | A * | 1/1947 | Hansen | 363/108 |
| 3,991,351 | A * | 11/1976 | Chalmers | 318/711 |
| 4,329,603 | A * | 5/1982 | Ballard | 310/61 |
| 4,540,930 | A * | 9/1985 | Siedband | 322/4 |
| 4,796,143 | A | 1/1989 | Odenkirchen et al. | |
| 4,827,165 | A * | 5/1989 | Nold | 310/68 D |
| 6,118,201 | A | 9/2000 | Dulin et al. | |
| 6,608,473 | B2 * | 8/2003 | Beulich | 323/348 |
| 7,197,113 | B1 | 3/2007 | Katcha et al. | |
| 7,199,691 | B2 * | 4/2007 | Miya | 336/120 |
| 7,406,830 | B2 * | 8/2008 | Valentian et al. | 62/50.2 |
| 7,586,232 | B2 * | 9/2009 | Lopatinsky et al. | 310/267 |
| 7,868,723 | B2 * | 1/2011 | Dobbs | 336/84 C |
| 7,957,786 | B2 | 6/2011 | Katcha et al. | |

(Continued)

OTHER PUBLICATIONS

German Office Action, dated Nov. 20, 2012, issued in German Patent Application No. 10 2012 201 826.3.

*Primary Examiner* — Mohamad Musleh
*Assistant Examiner* — Joselito Baisa
(74) *Attorney, Agent, or Firm* — Ingrassia Fisher & Lorenz, P.C.

(57) ABSTRACT

A high frequency rotary transformer for an electrical machine includes a primary transformer component having a primary transformer winding, and a secondary transformer component having a secondary transformer winding. The primary transformer winding is configured to be coupled to a DC power source via a DC to AC converter. The secondary transformer winding is configured to be coupled to a winding of the rotor. Each of the primary and secondary transformer components are mechanically coupled to either the stator or the rotor. The secondary transformer component is configured to rotate with respect to the primary transformer component to produce a magnetic flux via the primary transformer winding and the secondary transformer winding.

19 Claims, 2 Drawing Sheets

(56) References Cited

U.S. PATENT DOCUMENTS

| | | | | |
|---|---|---|---|---|
| 8,013,706 | B2 * | 9/2011 | Simon et al. | 336/120 |
| 8,137,102 | B2 * | 3/2012 | Rauchenzauner et al. | 433/132 |
| 8,143,824 | B2 * | 3/2012 | Mitsuda et al. | 318/376 |
| 8,179,013 | B2 * | 5/2012 | Ishizuka et al. | 310/207 |
| 2003/0173936 | A1 | 9/2003 | Sezgin et al. | |
| 2004/0100159 | A1 | 5/2004 | Rehder et al. | |

* cited by examiner

HIGH FREQUENCY ROTARY TRANSFORMER FOR SYNCHRONOUS ELECTRICAL MACHINES

FIELD OF THE INVENTION

The present invention generally relates to synchronous electrical machines, and more particularly relates to transformers used in connection with wound-rotor synchronous machines and the like.

BACKGROUND OF THE INVENTION

Modern wound-rotor synchronous machines typically require a stationary rotor field to interact with the stator field and produce torque at the machine shaft. The power to produce this stationary field is supplied from outside the motor in the form of DC current. Since the rotor of the machine rotates, it is necessary to supply power to the rotor through a rotating interface. Typically, this rotating interface is achieved through the use of brushes (stationary side) and slip rings (rotating side). This approach can be unsatisfactory with respect to long term durability (e.g., wear-out of brushes) and reliability (degradation of brush-to-slip-ring electrical contact in adverse environments).

Another approach, seen primarily in the power generation industry for large generators, is the use of a low frequency rotating transformer. The primary winding of the transformer is connected to the power grid through a rheostat or an autotransformer in order to adjust the input power. The secondary winding of the transformer rotates together with the rotor of the synchronous generator. A solid state or mechanical rectifier converts the AC power from the transformer secondary into DC power to be supplied to the field winding of the generator. Since such transformers operate at a relatively low grid frequency (e.g., 60 Hz), such a devices tend to be prohibitively large and heavy.

Accordingly, there is a need for more compact and efficient transformer designs for use in wound-rotor synchronous machines. Other desirable features and characteristics of the present invention will become apparent from the subsequent detailed description and the appended claims, taken in conjunction with the accompanying drawings and the foregoing technical field and background.

BRIEF SUMMARY OF EMBODIMENTS OF THE INVENTION

In accordance one embodiment of the invention, a high frequency rotary transformer for an electrical machine includes a primary transformer component having a primary transformer winding, and a secondary transformer component having a secondary transformer winding. The primary transformer winding is configured to be coupled to a DC power source via a DC-AC converter (inverter). The secondary transformer winding is configured to be coupled (e.g., indirectly, through a rectifier/filter circuit) to a winding of the rotor. Each of the primary and secondary transformer components are mechanically coupled to either the stator or the rotor. The secondary transformer component is configured to rotate with respect to the primary transformer component. The AC current in the primary produces a magnetic flux via the primary transformer winding and the secondary transformer winding.

A rotary transformer power supply system in accordance with one embodiment includes an inverter module configured to receive a DC input and a rotor current command; a rotor having a rotor winding provided therein; a rotary transformer, the rotary transformer comprising: a primary transformer component having a primary transformer winding, the primary transformer winding configured to be coupled to the inverter module; and a secondary transformer component having a secondary transformer winding coupled to the winding of the rotor, wherein each of the primary and secondary transformer components are mechanically coupled to either the stator or the rotor; and wherein the secondary transformer component is configured to rotate with respect to the primary transformer component to produce a magnetic flux via the primary transformer winding and the secondary transformer winding.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
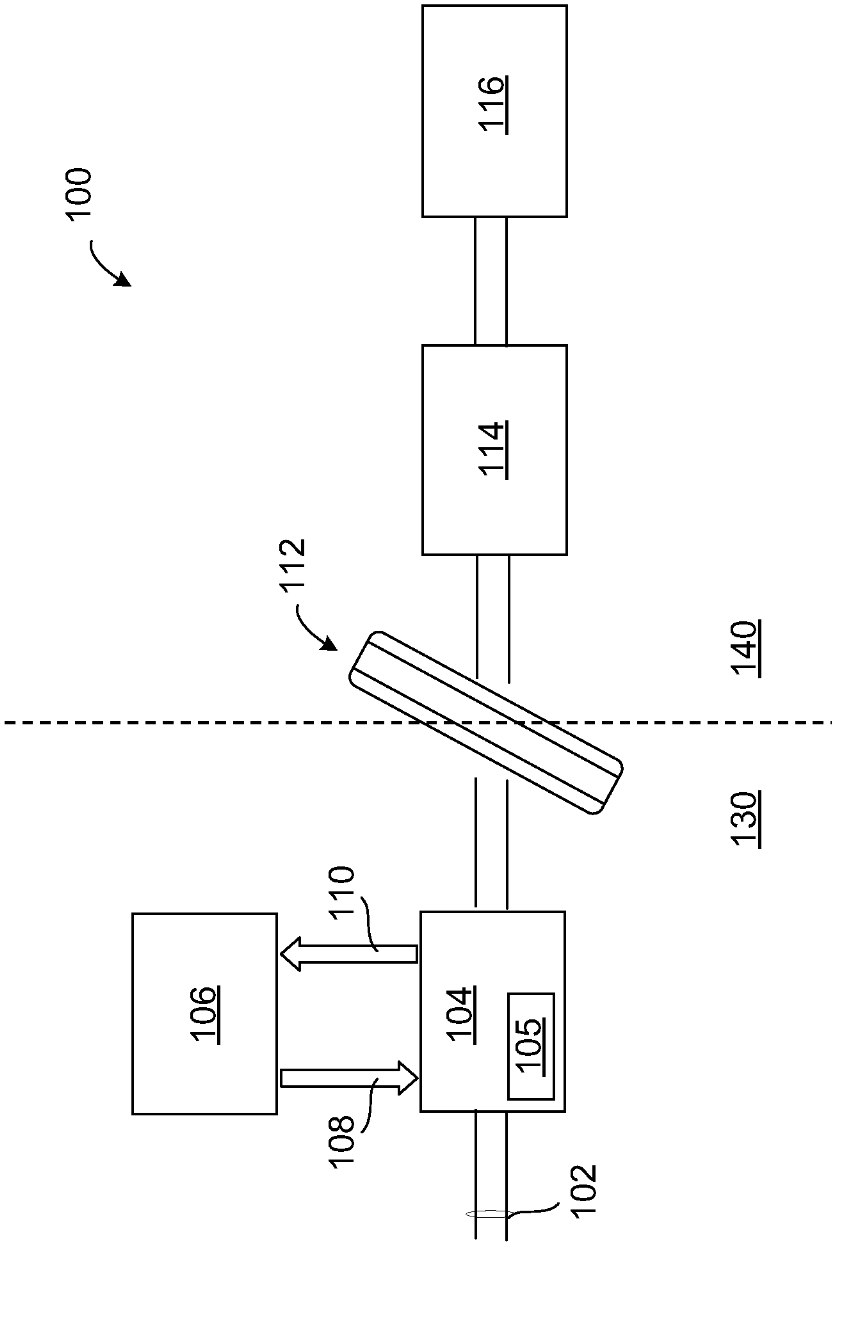
FIG. 1 is a conceptual block diagram of a rotary transformer power supply system associated with a synchronous machine in accordance with one embodiment.

In general, embodiments of the present invention relate to compact, light-weight, high frequency rotary transformers configured to provide power to the field windings of a wound rotor synchronous machine. For simplicity and clarity of illustration, the drawing figures depict the general structure and/or manner of construction of various embodiments. Elements in the drawings figures are not necessarily drawn to scale: the dimensions of some features may be exaggerated relative to other elements to assist understanding of the exemplary embodiments. In the interest of conciseness, conventional techniques, structures, and principles known by those skilled in the art may not be described herein, including, for example, fundamental principles of motors and rotary machines, and basic operational principles of transformers.

Referring to the conceptual block diagram shown in FIG. 1, a rotary transformer power supply assembly (or simply "assembly") 100 generally includes an DC-AC converter (inverter) 104 (and associated control processor or "processor" 105) electrically coupled to a synchronous machine rotor winding 116 through a rotary transformer 112 and rectifier/filter module 114. Thus, assembly 110 implements a DC-to-DC converter in which stationary components 130 are electrically coupled to rotating components 140 via rotary transformer 112, as described in further detail below.

Inverter 104, which may be a conventional switched power supply inverter known in the art, is coupled to a DC input 102—e.g., DC power from a traction bus of the type used in connection with hybrid electric vehicles. Inverter 104 also accepts rotor current commands 108 from, and sends status reports 110 to, an inverter control processor 106. Processor 105 receives the current command 108, controls the power conversion process, achieves supervisory and protection functions, and provides status reports 110 back to inverter control processor 106. Thus, the received rotor current command 108 is impressed upon the field windings of rotor 116 (through rotary transformer 112 and module 114).

Figure 2:
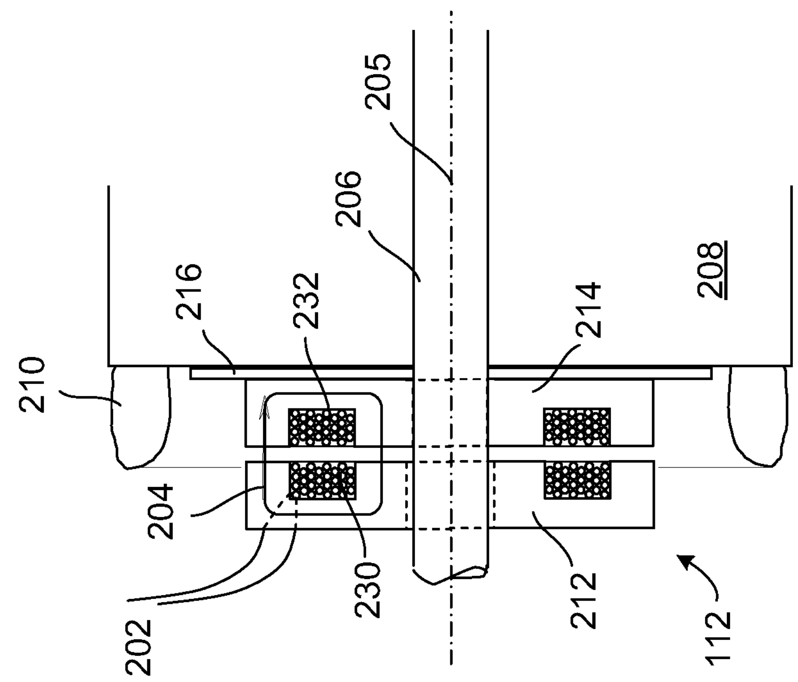
FIG. 2 is a schematic cross-sectional views of an axial gap rotary transformer in accordance with one embodiment.

Referring to the conceptual cross-sectional view shown in FIG. 2, a rotary transformer 112 in accordance with one embodiment of the invention will now be described. As shown, rotary transformer 112 includes a generally disc-shaped primary component 212 having primary transformer winding 230 (collectively referred to herein as the "primary"), and a corresponding secondary component 214 having secondary transformer winding 232 (collectively referred to herein as the "secondary"). As a gap is provided between primary 212 and secondary 214 in the axial direction (i.e., along rotational axis 205 of motor shaft 206), the embodiment illustrated in FIG. 2 is generally referred to as an "axial-gap" rotary transformer. It will be understood that FIG. 2 is a simplified, schematic illustration that is not necessarily drawn to scale and which in practical embodiments might include additional conventional motor components.

With continued reference to FIG. 2, primary 212 is mechanically coupled to the stator (not shown) as illustrated. Secondary 214, on the other hand, is coupled to a rotor 208—e.g., a rotor stack having corresponding rotor windings 210. In alternate embodiments, primary 212 may be coupled to the stator, while secondary 214 is coupled to rotor 208. Electrical contacts 202 provide connections from primary winding 230 to the stationary switched-mode power supply (i.e., inverter 104 of FIG. 1). A conventional rectifier/filtering circuit 216 (corresponding to block 114 in FIG. 1), is also mechanically coupled to rotor 208 and is electrically coupled between transformer windings 232 and rotor winding 210. During operation, rotor 208, rectifier/filtering circuit 216, secondary 214, and motor shaft 206 rotate with respect to primary 212 and the associated stator (not shown). As a result, a flux path 204, independent of the rotor speed or position is generated by via windings 230 and 232, thereby providing the commanded power to winding 210.

Rotary transformer 112 may be fabricated in a variety of ways and using a variety of known materials. In one embodiment, for example, rotary transformer 112 comprises a ferrite rotary transformer. The segmentation of the core of rotary transformer 112 as shown improves robustness, preventing the magnetic material of the core from fracturing under vibration if a brittle material (such as ferrite) is used. The size of transformer 112 may be selected to achieve the desired performance based on rotor size, stator size, etc.

Figure 3:
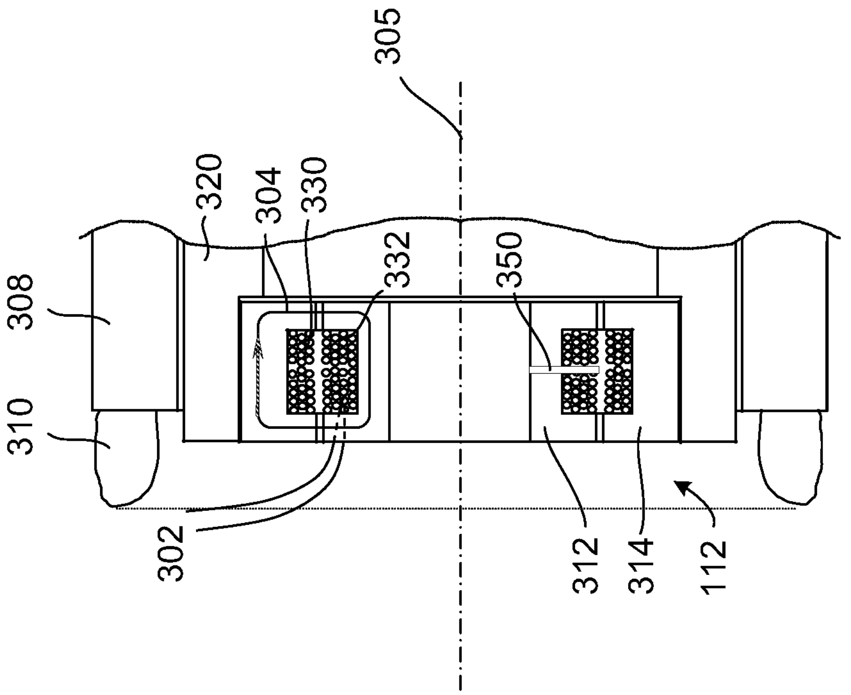
FIG. 3 is a schematic cross-sectional views of a radial gap rotary transformer in accordance with an embodiment.

Referring now to FIG. 3, an alternate embodiment of rotary transformer 112 will now be described. Unlike the embodiment shown in FIG. 2, the illustrated embodiment includes a radial-gap between the transformer's primary and secondary components. More particularly, rotary transformer 112 in this embodiment includes a primary component 312 having a primary transformer winding 332 (collectively referred to herein as a "primary"), and a corresponding secondary component 314 having a secondary transformer winding 330 (collectively referred to herein as a "secondary"). A gap is provided between primary 312 and secondary 314 in the radial direction (i.e., extending radially from rotational axis 305). The embodiment illustrated in FIG. 3 is generally referred to as a radial-gap rotary transformer.

Primary 312 is mechanically coupled to a stator 308 having stator windings 310, as illustrated. Secondary 314 is mounted within a rotor hub 320, and rotates therewith. In alternate embodiments, primary 312 may be coupled to rotor hub 320, while secondary 314 is coupled to stator 308. Electrical contacts 302 provide connections from primary winding 332 to the stationary switched-mode power supply (e.g., inverter 104 of FIG. 1). A suitable rectifier/filtering circuit is incorporated into rotary transformer 112 adjacent the secondary core of the transformer. During operation, rotor hub 320, secondary 314, and rectifier/filter rotate with respect to primary 312 and stator 308. As a result, a flux path 304 is generated by via windings 330 and 332, thereby providing the commanded power to rotor winding.

It will be appreciated that, in accordance with the embodiment shown in FIG. 3, nesting rotary transformer 112 within motor rotor hub 320 saves space by reducing the total length of the electrical machine. That is, rotary transformer 112 does not extend, in the axial direction, beyond rotor hub 320 itself. Furthermore, since the outer portion of transformer 112 is coupled to the rotor, the resulting centrifugal forces exerted on the rotor winding tends to push the winding inside the structure. In this way, winding retention at high rotor speeds is achieved automatically.

It is desirable that the magnetic flux (304, 204) in the core of rotary transformer 112 be independent of the angular position between the transformer stationary part (stator, or primary) and rotating part (rotor, secondary). In accordance with the embodiments of FIGS. 2 and 3, when the rotor of the transformer rotates with the rotor of the motor at any speed, the voltage induced into it by the primary does not change, regardless of the relative speed between the primary and secondary.

In various embodiments, to achieve high power density, the rotating transformer is preferably cooled with a fluid such as a conventional oil. For example, oil provided from an automotive transmission may be introduced between the moving surfaces of rotary transformer 112. Oil passages may then be provided into the rotor and/or stator for winding cooling. As depicted in FIG. 3, an oil path 350 may be provided for lubricating the respective surfaces of rotary transformer 112.

In accordance with one embodiment, in order to compensate for any axial play in the motor rotor 320, which might bring misalignment between the components of transformer 112, one of the components is preferably configured to be thicker in the axial direction by an amount equal to the maximum axial play value. In this way, the flux (204, 304) through the transformer 112 will be substantially invariant within the axial play limits of the rotor.

It will be appreciated that the rotary transformer 112 illustrated in FIGS. 2 and 3 is a high frequency transformer typically on the order of tens or hundreds of kilohertz or higher. This is in contrast to large, low frequency transformers that operate at a frequency of on the order of 60 Hz.

In accordance with the illustrated embodiments, the windings 230 and 232 of FIG. 2, and the windings 330 and 332 of FIG. 3 consist of continuous toroids, rather than being segmented windings as in many prior art transformers.

In summary, what has been described is an improved rotary transformer design to power the field winding of wound rotary synchronous machines. By using segmented primary and secondary transformer components as shown, a very compact, light, and manufacturable high frequency power supply is provided.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A high frequency rotary transformer for an electrical wound rotor synchronous machine having a stator and a rotor, the rotary transformer comprising:

a primary transformer component having a primary transformer winding, the primary transformer winding configured to be coupled to a DC power source; and a secondary transformer component having a secondary transformer winding, the secondary transformer winding configured to be coupled to a winding of the rotor;

an AC-DC component interconnected between the secondary transformer component and the rotor, wherein each of the primary and secondary transformer components are mechanically coupled to either the stator or the rotor; and wherein the secondary transformer component is configured to rotate with respect to the primary transformer component to produce a magnetic flux via the primary transformer winding and the secondary transformer winding.

2. The rotary transformer of claim 1, wherein the secondary transformer component is configured to rotate with respect to the primary transformer component to provide a transformer frequency greater than approximately 60 Hz.

3. The rotary transformer of claim 1, wherein the primary transformer component and the secondary transformer component are separated by an axial gap.

4. The rotary transformer of claim 3, wherein the primary transformer component is mechanically coupled to the stator, and the secondary transformer component is mechanically coupled to the rotor.

5. The rotary transformer of claim 1, wherein the primary transformer component and the secondary transformer component are separated by a radial gap.

6. The rotary transformer of claim 5, wherein the primary transformer component is mechanically coupled to the stator, and the secondary transformer component is mechanically coupled to the rotor.

7. The rotary transformer of claim 6, wherein the secondary transformer component is nested within an inner diameter of a hub of the rotor.

8. The rotary transformer of claim 1, further including a cooling liquid path provided within at least one of the primary transformer component and the secondary transformer component.

9. The rotary transformer of claim 1, wherein the cooling liquid path is configured to accept automotive transmission oil.

10. A rotary transformer power supply system comprising:

an inverter module configured to receive a DC input and a rotor current command;

a rotor having a rotor winding provided therein;

a rotary transformer, the rotary transformer comprising:

a primary transformer component having a primary transformer winding, the primary transformer winding configured to be coupled to the inverter module; and a secondary transformer component having a secondary transformer winding coupled to the winding of the rotor;

an AC-DC component interconnected between the secondary transformer component and the rotor, wherein each of the primary and secondary transformer components are mechanically coupled to either the stator or the rotor; and wherein the secondary transformer component is configured to rotate with respect to the primary transformer component to produce a magnetic flux via the primary transformer winding and the secondary transformer winding.

11. The system of claim 10, wherein the primary transformer component and the secondary transformer component are separated by an axial gap.

12. The system of claim 11, wherein the primary transformer component is mechanically coupled to the stator, and the secondary transformer component is mechanically coupled to the rotor.

13. The system of claim 10, wherein the primary transformer component and the secondary transformer component are separated by a radial gap.

14. The system of claim 13, wherein the primary transformer component is mechanically coupled to the stator, and the secondary transformer component is mechanically coupled to the rotor.

15. The system of claim 14, wherein the secondary transformer component is nested within an inner diameter of a hub of the rotor.

16. The system of claim 10, wherein the primary transformer winding and the secondary transformer winding are toroidal.

17. The system of claim 10, wherein the secondary transformer component is configured to rotate with respect to the primary transformer component to provide a transformer frequency greater than approximately 60 Hz.

18. A method of providing power to an electrical machine having a rotor and a stator, the method comprising:

receiving, at a high frequency rotary transformer, an AC signal indicative of a rotor current command;

coupling the AC signal through the high frequency rotary transformer by rotating a secondary winding of the high frequency rotary transformer with respect to a primary winding of the high frequency rotary component to produce a magnetic flux;

converting the coupled AC signal to a DC via an AC-DC component that is interconnected between the high frequency rotary transformer and the rotor winding;

providing the DC signal to a winding of the rotor.

19. The method of claim 18, wherein the coupling includes rotating the secondary winding with respect to the primary winding such that the frequency of the high frequency rotary transformer is greater than approximately 60 Hz.

* * * * *